United States Patent [19]

Di Salvo, Jr. et al.

[11] 4,125,687
[45] Nov. 14, 1978

[54] RECHARGEABLE NONAQUEOUS CELL WITH CHALCOGENIDE ELECTRODE

[75] Inventors: Francis J. Di Salvo, Jr., Florham Park; Donald W. Murphy, Warren, both of N.J.

[73] Assignee: Bell Telephone Laboratories, Incorporated, Murray Hill, N.J.

[21] Appl. No.: 810,176

[22] Filed: Jun. 27, 1977

[51] Int. Cl.² .............................................. H01M 6/14
[52] U.S. Cl. ................................ 429/194; 429/191; 429/221; 429/223; 429/224
[58] Field of Search ........ 429/194, 196, 197, 191–193, 429/221, 223, 224, 218

[56] References Cited

U.S. PATENT DOCUMENTS

| 3,791,867 | 2/1974 | Broadhead et al. | 429/191 |
| 3,864,167 | 2/1975 | Broadhead et al. | 429/194 |
| 4,009,052 | 2/1977 | Whittingham | 429/191 |
| 4,041,220 | 8/1977 | Armand | 429/194 X |
| 4,049,887 | 9/1977 | Whittingham | 429/194 X |

FOREIGN PATENT DOCUMENTS 819,672  3/1975  Belgium.
819,673  3/1975  Belgium.

OTHER PUBLICATIONS

Jour. Chem. Physics, 64 pp. 3670–3673, May 1, 1976.
Physical Review Letters 36, pp. 885–888, Apr. 12, 1976.

*Primary Examiner*—Charles F. LeFevour
*Attorney, Agent, or Firm*—Richard D. Laumann

[57] ABSTRACT

A nonaqueous secondary cell having a conventional alkali metal anode and a cathode which contains as the active material a chalcogenide having the nominal atom composition $M_xN_{1-x}S_2$ where M is Mn, Fe, Ni or Co, or mixtures thereof, N is V or Cr or mixtures thereof, and $x$ is less than or equal to 0.5 when N is V and M is Fe; less than or equal to 0.33 when N is V and M is Ni, Co or Mn; and less than 0.33 when N is Cr.

5 Claims, 2 Drawing Figures

RECHARGEABLE NONAQUEOUS CELL WITH CHALCOGENIDE ELECTRODE

BACKGROUND OF THE INVENTION

1. Field of the Invention

The invention relates generally to nonaqueous cells and particularly to nonaqueous secondary cells having positive electrodes containing layered chalcogenides as the active material.

2. Description of the Prior Art

There has been considerable interest in recent years in nonaqueous cells because of their potentially high energy densities. Particularly attractive are nonaqueous cells using negative electrodes made with Group I elements, such as lithium or sodium, because the high standard potential and low weight density of these elements afford exceptional possibilities for high cell voltage and high energy capacity per unit weight and per unit volume. Cells having these properties would be useful in any situation in which cell weight and/or volume are critical factors. The positive electrode material should be electrically conductive, because at high discharge rates the energy density depends on the conductivity of the positive electrode material, and also should have properties that enable it to react readily and reversibly with the negative electrode material to enhance secondary battery characteristics. To retain the weight advantages afforded by the negative electrode material, the positive electrode material should also be light.

Positive electrode materials presently contemplated by persons investigating nonaqueous cells include the layered dichalcogenides of the transition metals of Groups IVB and VB of the periodic table. These materials have attracted much interest because of their ability to intercalate a number of species, including lithium, between the layers. The term intercalate is used to mean movement both into and out of the layered structure.

One such layered chalcogenide that appears promising and has been the object of several studies is $TiS_2$. The $TiS_2$ structure consists of a sandwich formed by a layer of Ti atoms surrounded on either side by a layer of chalcogens. The negative electrode is made from a species, e.g., lithium, which intercalates between the $TiS_2$ layers as the cell charges and discharges. Studies performed with techniques such as nuclear magnetic resonance and x-ray diffraction indicate that $Li_xTiS_2$, for all values of $x$ between 0 and 1, i.e., as the cell goes through a complete charge or discharge cycle, forms a single non-stoichiometric phase. $Li_xTiS_2$ cells have a middischarge, i.e., $x = 0.5$, voltage of 2.2 volts and an energy density of 480 watt-hour/kg and are easily reversible for a large number of cycles.

Although seemingly possessing properties making them attractive for use in nonaqueous cells, some layered chalcogenides have not yet been successfully so used. An example is $VS_2$ which is theoretically more attractive than $TiS_2$ in a cell using a lithium negative electrode because the values for both the voltage and energy density should exceed the values for $TiS_2$. The properties of $LiVS_2$ cells have, however, never been previously reported apparently because both the lack of a method for preparing stoichiometric $VS_2$ has precluded preparing the cells in the charged state, and more fundamentally, as is now known from the present study, $LiVS_2$ cells have limited reversibility, approximately 50 percent of the theoretical capacity based on one lithium atom per vanadium atom, at room temperature when put through complete charge-discharge cycles. Although the reason for this limited reversibility at room temperature is not known with certainty, it is believed due to phase changes in the $LiVS_2$ system as lithium intercalates during a charge and discharge cycle. $Li_xVS_2$ for $x = 0$ and for $x > 0.6$ has a regular hexagonal structure. The system has slightly distorted monoclinic structures for $0.2 < x < 0.33$ and $0.5 < x < 0.6$. For $0.33 < x < 0.5$ and $0.0 < x < 0.2$, the system consists of two phases.

The presence, at room temperatues, of the additional phases decreases cell capacity to approximately 50 percent of the theoretical value when the cell is cycled at moderate current densities because the intercalation process is not readily reversed, as it is for $TiS_2$, due to slow attainment of equilibrium conditions. The reason for slow attainment of equilibrium is not known with certainty but appears related to either reduced lithium mobility or a slow rate of phase nucleation. Similar considerations have limited both use and investigation of $LiCrS_2$ cells.

SUMMARY OF THE INVENTION

According to the present invention, a nonaqeuous secondary cell uses the layered chalcogenides having the nominal atom composition $M_xN_{1-x}S_2$; N being selected from the group consisting of V, Cr and mixtures thereof, M being selected from the group consisting of Mn, Fe, Ni, and Co and mixtures thereof, $x$ less than or equal to a maximum value of 0.5 when N is V and M is Fe; less than or equal to a maximum value of 0.33 when N is V and M is Ni, Co or Mn; and less than a maximum value of 0.33 when N is Cr, said maximum value scaling linearly with atom percent; as the active material in the positive electrode and a conventional material, e.g., lithium or sodium as the negative electrode. It has been found that the addition of Mn, Fe, Ni or Co makes the intercalation of lithium or sodium with $M_xN_{1-x}S_2$ readily reversible and permits the cells to be cycled numerous times. In a preferred embodiment M is Fe, N is V, and $x$ is greater than 0.20 and less than or equal to 0.33.

DETAILED DESCRIPTION

Figure 1:
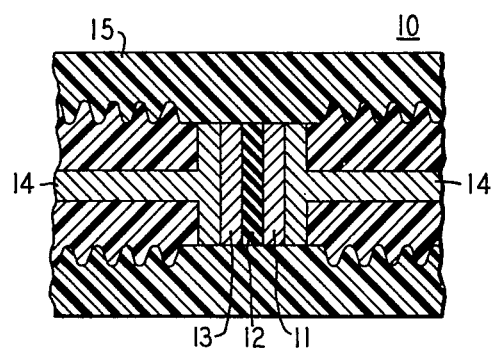
FIG. 1 shows a side view of a cell employing a conventional negative electrode and a positive electrode having a layered chalcogenide as the active substance.

FIG. 1 shows a side view of a cell structure 10 with a negative electrode 11, a separator 12 impregnated with an electrolyte and a positive electrode 13 containing the layered chalcogenide as the active electrode material. Also shown are current collectors 14, on both sides of the electrodes, and the surrounding structure 15 which is usually made of an inert, non-conducting material. Other cell structures such as one having thin film electrodes may also be constructed. A cell with thin film electrodes may be assembled in several ways including putting the various sheets forming the electrodes and separator together to form a rectangular battery or rolling in the form of a cylinder.

Figure 2:
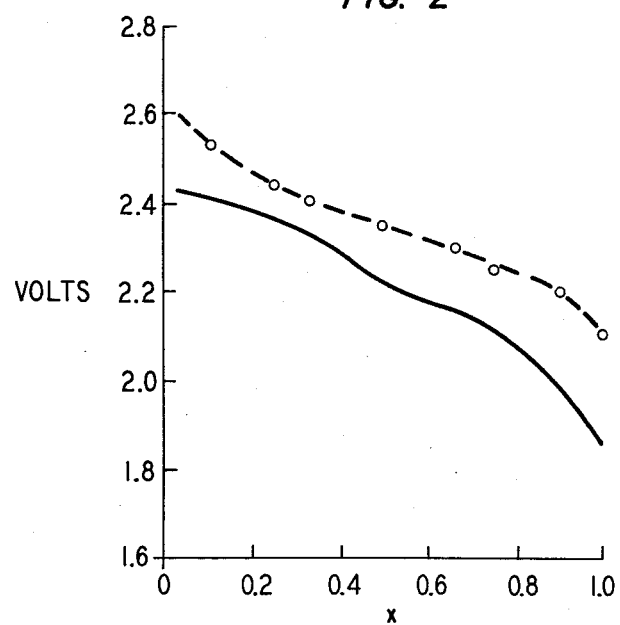
FIG. 2 shows cell voltage for $Li_xTiS_2$ and $Li_xVS_2$ cells as a function of lithium content, as represented by $x$, for cells using $TiS_2$ and $VS_2$ as the positive electrode material.

FIG. 2 relates for a $Li_xTiS_2$ cell, solid line, and a $Li_xVS_2$ cell, dashed line, cell voltage in volts, on the ordinate and lithium content, represented by $x$, on the abscissa. The circles on the dashed line represent the open circuit values for $Li_xVS_2$ compounds prepared as later described and with no current flowing.

The dichalcogenides having the nominal atom composition $M_xN_{1-x}S_2$, where M is Mn, Fe, Co, or Ni or mixtures thereof, and N is V or Cr, form two dimensional layered structures structurally similar to $TiS_2$ and $VS_2$ and also possessing the ability to intercalate, with relative ease, small atomic species, such as lithium, between layers of the structure. Although the composition of the active cathode material is described in terms of a stoichiometric composition, this composition is only the nominal atom composition and the actual compositions used may deviate from the nominal composition by as much as plus or minus five percent from stoichiometry. Greater deviations from stoichiometry are undesirable as the intercalation process may be significantly slowed. The chalcogenide is described in terms of N being V or Cr or mixtures thereof, but other substituents, such as Group Iv B, V B or VI B transition metals, may replace the same amount of V or Cr. The Mn, Fe, Co or Ni atoms randomly substitute in the lattice for V or Cr atoms without significantly changing the voltages shown in FIG. 2. The substituents apparently reduce order in the structure and the reduced order probably results in only a single phase being present during the intercalation process and certainly results in weakening and broadening phase transitions to allow easy formation of these phases at room temperature as atomic species intercalate. Minimization of the problem of slow intercalation due to, e.g., phase transitions, by the addition of order reducing substituents results in cells having $M_xN_{1-x}S_2$ as the active positive electrode material and easy reversibility. Easy intercalation of lithium and other atoms, such as sodium, in the $M_xN_{1-x}S_2$ structure makes the compounds useful as the active material in cathodes of nonaqueous cells operating at room temperatures and having high cell voltage and high energy density.

I. Preparation of the Active Cathode Material

The active material, $M_xN_{1-x}S_2$, may be prepared in a variety of ways. The preparatory operations are carried out in the absence of air since the chalcogenides in the discharged state may be highly reactive toward moisture. The following methods have been found to yield good results.

To prepare the active material in the discharged state, i.e., with sodium or lithium, stoichiometric quantities of the alkali metal carbonate and the oxide of M, and an oxide of N, e.g., $V_2O_5$ or $Cr_2O_3$, are placed in an inert container, such as a graphite boat, within a quartz tube. The temperature is raised to a value that is typically within the range extending from 300° C to 800° C and a flow of sulfur or a sulfur containing compound such as $CS_2$ or $H_2S$ introduced. The reaction is allowed to proceed until evolution of water or $CO_2$, depending upon the sulfur compound used, ceases. Lower temperatures require a longer time and above 800° C, if $H_2S$ is used, water is evolved too vigorously to permit easy preparation of the material. The quartz tube is then sealed under an inert atmosphere, e.g., argon, and placed in a dry box. To insure complete reaction of all of the initial material, the material is now ground, thoroughly mixed and refired in $H_2S$ at a temperature within the range from 300° C to 800° C for 16 to 24 hours. This step is desirable as all of the material may not have been exposed to sulfur in the initial step. The quartz tube is sealed under argon and reopened only under argon.

$M_xN_{1-x}S_2$, the charged state, may be prepared by adding an oxidizing agent with an oxidizing potential of at least 2.8 volts (measured with respect to a $Li/Li^+$ electrode) to the material prepared according to the previous paragraph. Suitable oxidizing agents include iodine, chlorine and bromine. The oxidizing agent is conveniently added in a solvent which is inert to the oxidizing agent and in which the lithium or sodium containing product is soluble. A suitable solvent is acetonitrile. The mixture is stirred until the oxidizing agent is consumed. The mixture is then filtered, washed with a solvent such as acetonitrile and vacuum dried. If $x = 0$, the method permits preparation of $VS_2$ which has not been previously prepared. Pure $CrS_2$ cannot be prepared in this manner but $M_xCR_{1-x}S_2$ with $x$ having values less than 0.33 may be prepared. $Cr_xV_{1-x}S_2$, with $x$ less than or equal to 0.75 may also be prepared in this manner.

The chemistry of the described processes is summarized by an example showing the preparation of $LiFe_xV_{1-x}S_2$:

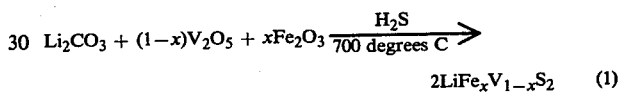

$$Li_2CO_3 + (1-x)V_2O_5 + xFe_2O_3 \xrightarrow[700 \text{ degrees C}]{H_2S}$$

$$2LiFe_xV_{1-x}S_2 \quad (1)$$

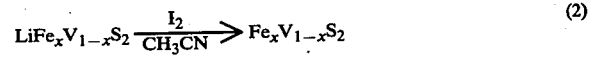

$$LiFe_xV_{1-x}S_2 \xrightarrow[CH_3CN]{I_2} Fe_xV_{1-x}S_2 \quad (2)$$

If desired, intermediate compounds, i.e., compounds with $y$ less than 1, with the formula $Li_yFe_xV_{1-x}S_2$ may also be prepared:

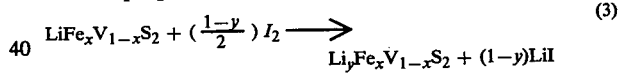

$$LiFe_xV_{1-x}S_2 + (\frac{1-y}{2})I_2 \longrightarrow$$

$$Li_yFe_xV_{1-x}S_2 + (1-y)LiI \quad (3)$$

Similar equations describe the processes for the other cathode materials, i.e., for the cases where M is Mn, Ni or Co; N is Cr, or where Na is used as the anode material. If M is Fe and N is V, the value of $x$ is desirably $\leq 0.5$ as Fe compounds other than $Fe_xN_{1-x}S_2$ may be present if this value is exceeded. It has been found that the best cell properties are obtained if $x$ is greater than 0.20 and less than 0.33. For Mn, Ni and Co, and where N is V the value of $x$ is desirably less than 0.33 to prevent formation of unwanted compounds. If N is Cr, $x$ is less than or equal to 0.33, to insure that unwanted compounds are not present. If mixtures are present, the maximum value of $x$ scales linearly with the atom percent of each element. For example, if N is V and M is 50 percent Fe and 50 percent Mn by atom percent, the maximum value of $x$ is 0.42.

II. Cell Construction

In general, cell fabrication may be carried out to yield the cell in either the charged or discharged state. One typical construction method will be briefly outlined. A mixture of $LiM_xN_{1-x}S_2$ and a material, such as polyethylene, that acts as a binder is thoroughly mixed as by rolling on a jar mill. Other materials that are also nonreactive with the compound and do not alloy with lithium may also be used. The mixture is pressed into a nonreactive metal grid such as one made of Ni, Fe, Co or Ti.

The pressing should result in mechanical integrity and good electrical contacts as well as good electrical conductivity. It has been found that pressing at 130° C with a pressure of approximately 2,000 pounds per square inch yields good results. It is also desirable that air be excluded during these operations to prevent undesired chemical reactions between the chalcogenide or anode material, such as lithium, and water and accordingly the operations are conveniently carried out in a dry box. The pressed material forms the cathode and is sandwiched between two plates forming a conventional anode made from, e.g., lithium or sodium. Alternatively, the structure of FIG. 1 may be made in which case only one lithium or sodium plate is necessary to form the anode. The electrolyte used in the cell is conventional and a variety of electrolytes which do not react chemically with either the anode or cathode materials and which are electrically conductive to permit ready migration of ions during the intercalation process may be used. Typical electrolytes include $LiPF_6$, $LiClO_4$, etc. The electrolyte may be present either in the pure state or dissolved in a suitable solvent such as propylene carbonate, ethylene carbonate, etc. Solid electrolytes such as LiI may also be used. The cell is sealed to insure isolation of the material from air after its removal from the dry box and provided with suitable electrical contacts.

III. Examples

1. Preparation of $LiFe_{0.25}V_{0.75}S_2$.

A mixture of 4.329 grams of $Li_2CO_3$, 2.339 grams of $Fe_2O_3$ and 7.992 grams of $V_2O_5$ was placed in a graphite boat, within a quartz tube, and maintained for 2 hours at a temperature of 500° C in a flow of $H_2S$. The temperature was raised to 700° C for 18 hours. The quartz tube was sealed under argon and placed in a dry box. The material was ground, mixed and refired in $H_2S$ for 18 hours at 700° C. The tube was then sealed and subsequently opened only when under argon.

2. Preparation of $Fe_{0.25}V_{0.75}S_2$.

To 1.450 grams of $LiFe_{0.25}V_{0.75}S_2$, 50 ml of a 0.236 N iodine solution in 200 ml of acetonitrile were added under argon. The reaction mixture was stirred for 18 hours, filtered, washed with acetonitrile and vacuum dried.

3. Preparation of $LiCr_{0.33}V_{0.33}Fe_{0.33}S_2$.

A mixture of 5.031 grams of $Li_2CO_3$, 3.45035 grams of $Cr_2O_3$, 3.6237 grams of $Fe_2O_3$, and 4.1275 grams of $V_2O_5$ was placed in a graphite boat and prepared as was the material in Example 1.

4. Preparation of $LiV_{0.67}Mn_{0.33}S_2$.

A mixture of 4.9566 grams of $Li_2CO_3$, 8.1339 grams of $V_2O_5$ and 3.8874 grams of $MnO_2$ was placed in a graphite boat and prepared as was the material in Example 1.

5. Preparation of a $LiFe_{0.5}V_{0.5}S_2$ (discharged) cell.

A mixture of $LiFe_{0.5}V_{0.5}S_2$ (77.1%), graphite (15.4%) and polyethylene powder (7.5%) was thoroughly mixed by rolling on a jar mill. 1.005 grams of the mixture were pressed into an expanded nickel grid having dimensions of 2.2cm × 2.5cm at 130° C with a pressure of approximately 2000 p.s.i. The rolling and pressing operations were carried out with air excluded. This electrode, forming the cathode, was sandwiched between two conventional lithium anodes. Adjacent electrodes were separated by glass filter paper. A 1M solution of $LiClO_4$ in propylene carbonate was added as the electrolyte. The entire cell was sealed to exclude air and electrical contacts were provided.

6. Preparation of a $LiFe_{0.25}V_{0.75}S_2$ (discharged) cell with lithium.

The cell was constructed, as in FIG. 1, with a sheet of lithium approximately 15 mils thick and having a surface area of about 1cm$^2$, a porous glass separator, 27.7 mg of loose $LiFe_{0.25}V_{0.75}S_2$ powder prepared as in Example 1, and several drops of 1M $LiClO_4$ in propylene carbonate. The nickel-plated current collectors were tightened to make electrical contact.

7. Preparation of a $Fe_{0.25}V_{0.77}S_2$ (charged) cell with lithium.

The cell was constructed with a lithium sheet approximately 15 mils thick and a surface area of about 1 cm$^2$, a porous glass separator, 14 mg of loose $Fe_{0.25}V_{0.75}S_2$ powder prepared as in Example 2, and several drops of 1M $LiClO_4$ in propylene carbonate. The nickel-plated current collectors were tightened to make electrical contact.

8. Preparation of a $LiCr_{0.33}V_{0.33}Fe_{0.33}S_2$ (discharged) cell.

The cell was prepared as in Example 6 using material prepared as in Example 3.

9. Preparation of a $LiV_{0.67}Mn_{0.33}S_2$ (discharged) cell.

The cell was prepared as in Example 6 using material prepared as in Example 4.

10. Preparation of $VS_2$.

$LiVS_2$ was prepared as in Example 1 using stoichiometric quantities of $Li_2CO_3$ and $V_2O_5$. 200 ml of a 0.192 N iodine solution in acetonitrile were added to 4.670 grams of $LiVS_2$. The reaction mixture was stirred until the iodine color faded, filtered, washed with acetonitrile and vacuum dried.

Similar methods may be used for other values of $x$ within the ranges previously given and for materials and cells using Ni, Mn or Co rather than Fe.

IV. Cell Characteristics

The cell prepared as in Example 5 was cycled at room temperature with an average capacity over seven cycles of 22 ma hours with a middischarge voltage of 2.0 volts. The temperature was raised to 63° C and the average capacity for the next five cycles was 70 ma hours. The discharge current was then raised from 5 ma to 10 ma and the average capacity was 35 ma hours for the next six cycles.

Figure 3:
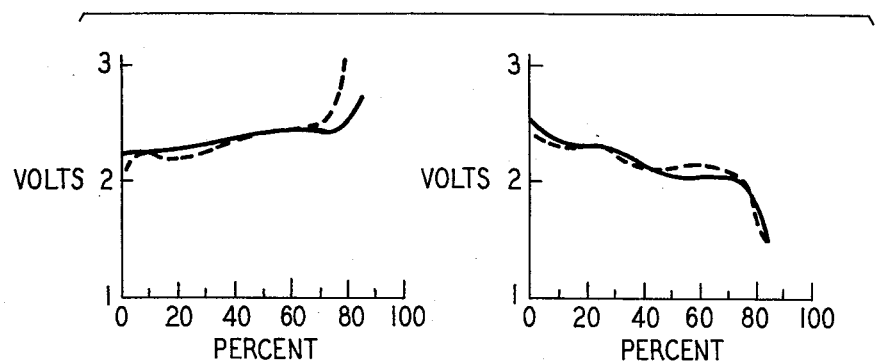
FIG. 3 shows cell voltage as a function of percent charge and discharge at a constant charge and discharge current for a cell using $Fe_{0.25}V_{0.75}S_2$ as the active cathode material and having a lithium anode.

A cell prepared according to the process described in III.6 was cycled with charge and discharge currents of 0.25 ma. The average discharge was 80 percent to 90 percent of one lithium atom per $Fe_{0.25}V_{0.75}S_2$ unit with middischarge potentials being approximately 2.2 volts. Curves showing the cell voltage, on the ordinate, plotted against the percent theoretical cell charge or discharge capacity on the abscissa, are shown in FIG. 3. The figure on the left is for charging and the figure on the right is for discharging. The solid lines represent the first charge and discharge cycle and the dashed lines represent the fifth charge and discharge cycle.

The cell prepared as in Example 7 was cycled at 0.5 ma. The initial capacity was 100 percent of the theoretical limit with a middischarge potential of 2.2 volts. The capacity on the fifteenth cycle was 90 percent of the theoretical limit.

The cell prepared as in Example 8 was cycled at 0.25 ma. The initial capacity was 75 percent of the theoretical limit with a middischarge potential of 2.45 volts. The capacity on the fourth cycle was 55 percent of the theoretical limit.

The cell prepared as in Example 9 was cycled at 0.25 ma. The initial capacity was approximately 50 percent of the theoretical limit with a middischarge potential of 2.25 volts. The capacity on the eighth cycle was 45 percent of the theoretical limit and the middischarge potential was 2.25 volts.

The easy reversibility of cells using layered chalcogenides having the nominal atom composition $M_xN_{1-x}S_2$ as the active cathode material, compared to cells using $LiVS_2$ or $LiCrS_2$, is believed at least partially due to $LiM_xN_{1-x}S_2$ forming, as indicated by x-ray diffraction, differential scanning calorimetry and magnetic susceptibility, weaker and broader distorted intermediate phases as the lithium or sodium concentration varies from zero to its stoichiometric value.

What is claimed is:

1. A nonaqueous secondary cell comprising a negative electrode comprising at least one element selected from the group consisting of lithium and sodium, an electrolyte, and a positive electrode containing active positive electrode material, characterized in that said active positive electrode material consists essentially of a layered chalcogenide having the nominal atom composition $M_xN_{1-x}S_2$, in which M is selected from the group consisting of Mn, Fe, Ni and Co and mixtures thereof and N is selected from the group consisting of V and Cr and mixtures thereof and in which $x$ is less than or equal to a maximum value of 0.5 when N is V and M is Fe, and $x$ is less than or equal to a maximum value of 0.33 when N is V and M is Ni, Co or Mn, and $x$ is less than a maximum value of 0.33 when N is Cr said maximum value scaling linearly with atom percent.

2. A cell as recited in claim 1 in which said electrolyte consists essentially of $LiClO_4$ dissolved in propylene carbonate.

3. A cell as recited in claim 1 in which M is Fe, N is V and $x$ is less than 0.33 and greater than 0.20.

4. A cell as recited in claim 3 in which the negative electrode is lithium.

5. A cell as recited in claim 4 in which said electrolyte consists essentially of $LiClO_4$ dissolved in propylene carbonate.

* * * * *